US009655127B1

(12) United States Patent
Srinivas et al.

(10) Patent No.: US 9,655,127 B1
(45) Date of Patent: May 16, 2017

(54) DYNAMIC MANAGEMENT OF CARRIER AGGREGATION BASED ON SMALL CELL OPERATING CONDITIONS

(71) Applicant: Sprint Spectrum L.P., Overland Park, KS (US)

(72) Inventors: Shilpa Kowdley Srinivas, Brambleton, VA (US); Hemanth B. Pawar, Brambleton, VA (US); Krishna Sitaram, Chantilly, VA (US); Daniel A. Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 329 days.

(21) Appl. No.: 14/575,653

(22) Filed: Dec. 18, 2014

(51) Int. Cl.
*H04W 4/00* (2009.01)
*H04W 72/04* (2009.01)

(52) U.S. Cl.
CPC .............................. *H04W 72/0486* (2013.01)

(58) Field of Classification Search
CPC .................................................. H04W 72/0486
USPC .................................................. 370/310–350
See application file for complete search history.

(56) References Cited

U.S. PATENT DOCUMENTS

| 8,711,812 B2* | 4/2014 | Quan | H04W 72/048 370/230 |
| 2014/0106764 A1* | 4/2014 | Huang | H04W 72/1252 455/452.1 |
| 2015/0148067 A1* | 5/2015 | Ying | H04W 64/00 455/456.1 |
| 2016/0112902 A1* | 4/2016 | Huh | H04W 28/0289 370/235 |

FOREIGN PATENT DOCUMENTS

EP              2709393 A1     3/2014

* cited by examiner

*Primary Examiner* — Ricky Ngo
*Assistant Examiner* — Wei-Po Kao

(57) ABSTRACT

Disclosed is a method and system for dynamically managing carrier aggregation based on operating conditions of small cells in a wireless communication system. A first base station may be configured for providing wireless services on a first wireless carrier band and a second wireless carrier band. One or more additional base stations may each configured for providing wireless services on the second wireless carrier band. A determination can be made that a load on the one or more additional base stations exceeds a threshold level while each is providing wireless coverage within a region that at least partially overlaps with wireless coverage provided by the first base station. In response, the first base can be caused to refrain from aggregating the first and second wireless carrier bands for providing wireless services under operational conditions defined to cause the base station to aggregate the first and second wireless carrier bands.

20 Claims, 10 Drawing Sheets

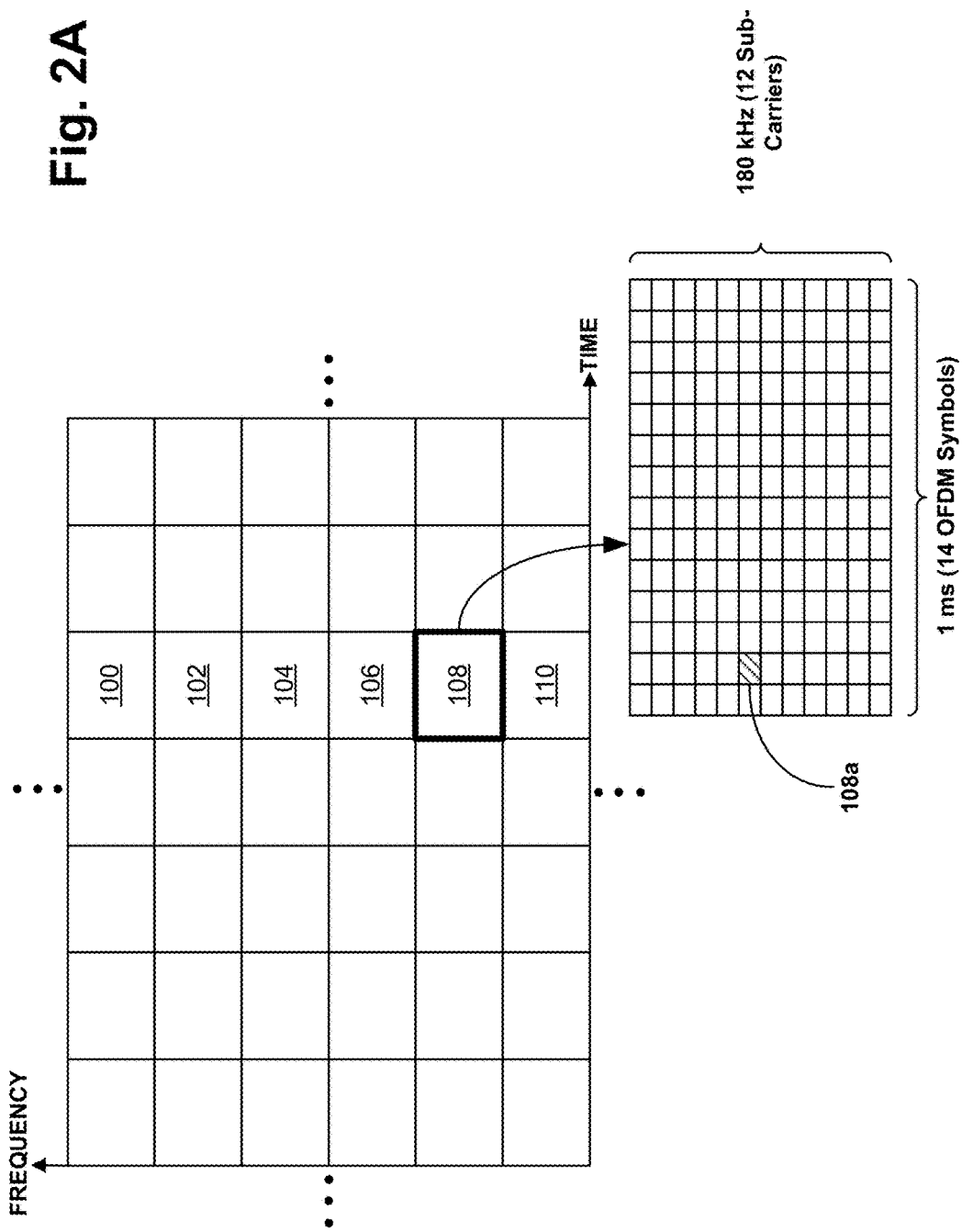

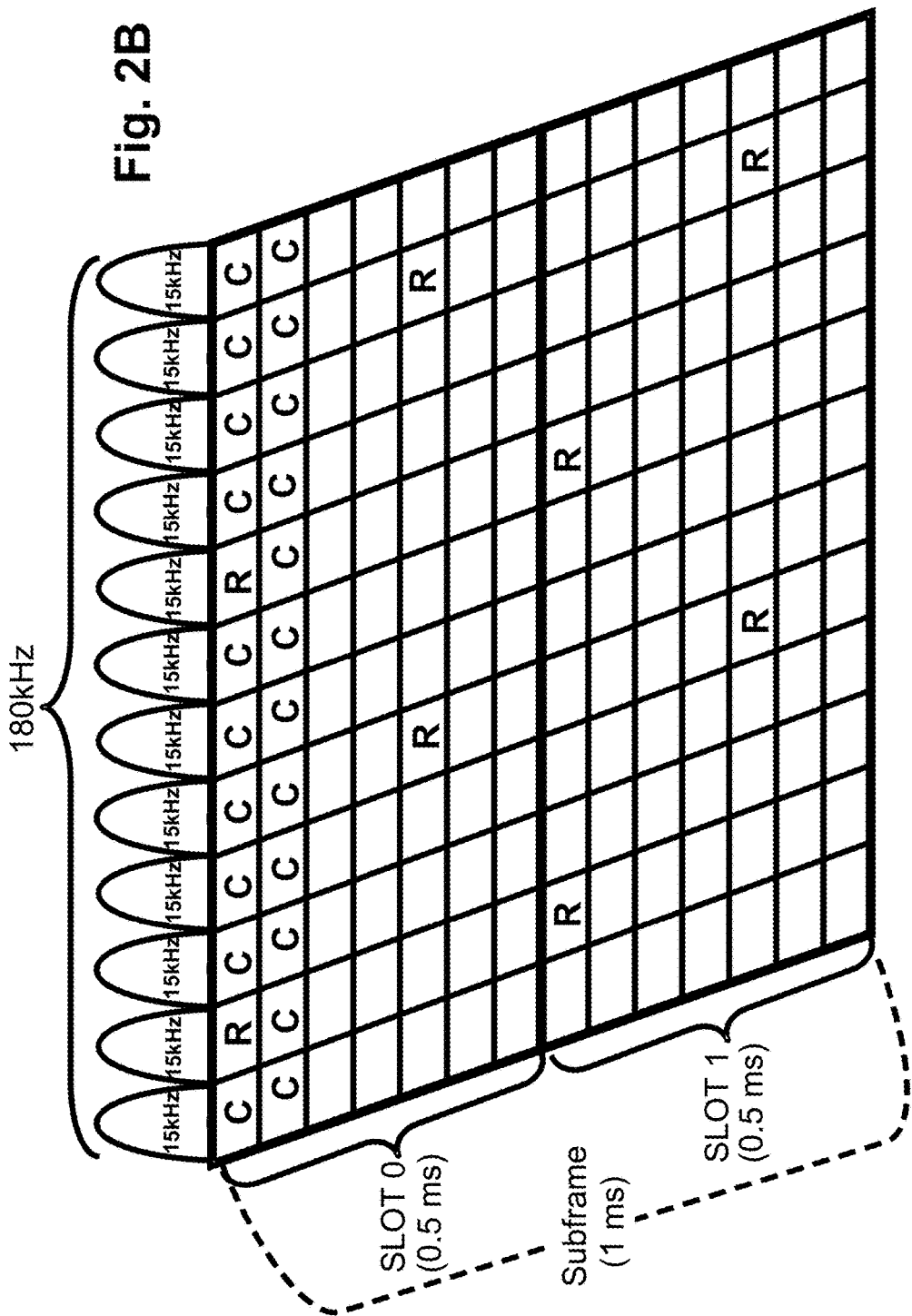

DYNAMIC MANAGEMENT OF CARRIER AGGREGATION BASED ON SMALL CELL OPERATING CONDITIONS

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover of between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a UE is within coverage of a base station, the base station may from time to time transmit downlink control signaling to the UE. The purpose of such downlink control signaling may depend on the air interface protocol and the circumstances. By way of example, each coverage area may define a downlink control channel that may carry certain information such as control channel formatting information, a downlink reference signal that UEs may detect as an indication of coverage, system information, paging information, and the like, or may define various downlink control channels for carrying subsets of this information.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

OVERVIEW

In practice, a typical cellular base station may transmit control signaling on a subset of air interface resources reserved to define a physical downlink control channel (PDCCH). Additionally, the base station may reserve a different subset of air interface resources to define a physical downlink shared channel (PDSCH) that the base station can use to carry transmissions on an as-needed basis to one or more UEs operating in a coverage area of the base station. Further, the base station may reserve another subset of air interface resources to define a physical uplink shared channel (PUSCH) that the base station can use to receive transmissions from the one or more UEs. In this arrangement, the PDCCH may carry downlink control information (DCI) messages including air interface assignments and other control information for one or more particular UEs. For example, the PDCCH may carry DCI messages to schedule bearer communication on the PDSCH and/or the PUSCH.

In a wireless communication system, a base station may operate to serve UEs on a carrier that spans a particular frequency bandwidth, and the different subsets of air interface resources reserved for the PDCCH, PDSCH, and PUSCH may form part of a set of air interface resources used on the carrier. Further, in some implementations, the base station may be arranged to operate on multiple carriers, each including a different set of air interface resources. In particular, in such an arrangement, the base station may use carrier aggregation to serve multiple UEs on multiple carriers at once. Using carrier aggregation, each such served UE may concurrently receive service from the base station on, for example, two carriers (e.g., referred to as component carriers (CCs)). In an example implementation, the PDSCH may span both such carriers, thereby allowing the base station to allocate bearer communication resources to each of various UEs on both carriers at once. However, in this example implementation, the PDCCH that the base station uses to send DCI messages to a served UE may span only one of the two carriers. This carrier may be the served UE's "primary" carrier while the other carrier may be the served UE's "secondary" carrier. As such, the base station may use cross-carrier scheduling (CCS) to engage in PDCCH communication with a served UE using the primary carrier in order to allocate PDSCH resources on both the primary carrier and the secondary carrier.

The base stations in a wireless communication system can take various forms. For example, a first base station could be a macro base station operated by a wireless carrier to provide a broad range of coverage and may thus include a tall antenna tower and a power amplifier for providing high transmission power. Whereas, a second base station could be a small cell base station ("small cell"), such as a femtocell, typically having a much smaller form factor and operating at lower transmission power for providing a smaller range of coverage.

A wireless communication system may include several such base stations, and in some cases, the base stations may define coverage areas that at least partially overlap. Such overlapping coverage areas may allow for consistency in providing coverage to the UEs while ensuring a seamless handover from one base station to the next. For example, a particular region may include several macro base stations operated by a cellular service provider and positioned in the region in a manner that provides seamless handover while avoiding coverage gaps. However, in some cases, coverage provided by such macro base stations may not extend to a particular area, such as a home or an office. In this case, a small cell (e.g., a femto cell) may fill the coverage gap in the particular area. Other examples may also be possible.

In an arrangement including overlapping coverage areas, such as a macro base station and a small cell defining overlapping coverage areas, both base stations may be able to serve UEs on the at least some of the same sets of multiple carriers. For example, given two such carriers, the macro base station may allocate air interface resources on both carriers, while the small cell may allocate air interface resources on only one of the carriers. In particular, the macro base station may implement carrier aggregation using a first wireless carrier as a primary carrier and a second wireless carrier as a secondary carrier, while the small cell may only use the second wireless carrier without implementing carrier aggregation. Other arrangements are possible as well. For example, both base stations may allocate air interface resources on both carriers, enabling both base stations to implement carrier aggregation.

In conventional operation, a macro base station may activate carrier aggregation in response to determining that certain operating conditions are favorable for carrier aggregation. For example, if one or more UEs being served by the macro base station are operating under good RF conditions—as determined, e.g., by a high signal-to-noise ratio—then these UEs may be candidates for taking advantage of carrier aggregation. If the load on the macro base station's primary carrier is also high, then aggregating the primary carrier with a secondary carrier can also help mitigate possible detrimental effects of the highly loaded primary carrier. The availability of UEs able to take advantage of carrier aggregation, together with a diminishing capacity of its primary carrier, may thus serve as a sort of trigger that causes the macro base station to aggregate its primary carrier and at least one of its secondary carriers for wireless communications with at least one of the UEs.

However, while carrier aggregation can increase overall data transmission rates by virtue of greater available bandwidth, concurrent use of the same wireless carrier band by a macro base station and one or more small cells providing overlapping coverage can also increase interference in the wireless carrier band. In particular, if a wireless carrier used by the one or more small cells is the same as the secondary carrier of macro base station, then carrier aggregation can result in undesirable and/or unacceptable interference under certain conditions. For example, when the one or more small cells are heavily loaded on their wireless carrier—i.e., the secondary carrier of the macro base station—then the likelihood of interference on that carrier can be unacceptably high if carrier aggregation is used. Similarly, if the number of small cells within the coverage area of the macro base station is large, interference can again be unacceptably high if carrier aggregation is used. The potential for interference can increase further if there are a large number of highly loaded small cells. It would therefore be desirable to account for the current loading and number of small cells when determining whether or not a macro base station should activate carrier aggregation under operational conditions that would otherwise indicate or trigger carrier aggregation.

Accordingly, disclosed herein is a method and system for dynamically incorporating information about number and loading of small cells into a determination of whether or not a macro base station should activate carrier aggregation. More specifically, when operating conditions indicate that a macro base station should activate carrier aggregation with one or more UEs, a further determination that one or more small cells operating on the macro base station's secondary carrier are heavily loaded can be used as a sort of filter or veto to cause the macro base station to refrain from activating carrier aggregation. Further, the number of such small cells can also be included in the determination. In this way, unacceptably high interference on the secondary carrier can be reduced and/or avoided.

Hence, in one respect, various embodiments of the present invention provide a method operable in a wireless communication system including (i) a first base station configured for providing wireless services using a first set of air interface resources on a first wireless carrier band and using a second set of air interface resources on a second wireless carrier band, the first set of air interface resources and the second set of air interface resources being mutually exclusive, and (ii) one or more additional base stations each configured for providing wireless services using the second set of air interface resources on the second wireless carrier band, the method comprising: making a determination, by the wireless communication system, that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

In another respect, various embodiments of the present invention provide a wireless communication system comprising: a first base configured for providing wireless services using a first set of air interface resources on a first wireless carrier band and using a second set of air interface resources on a second wireless carrier band, the first set of air interface resources and the second set of air interface resources being mutually exclusive; one or more additional base stations each configured for providing wireless services using the second set of air interface resources on the second wireless carrier band; and a network entity configured for communication with the first base station and with each of the one or more additional base stations, wherein the network entity is further configured for: making a determination that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

Further, in still another respect, various embodiments of the present invention provide a non-transitory computer readable medium having stored thereon instructions that, upon executing by one or more processors of a wireless communication system, cause the wireless communication system to carry out operations, wherein the wireless communication system includes (i) a first base station configured for providing wireless services using a first set of air interface resources on a first wireless carrier band and using a second set of air interface resources on a second wireless carrier band, the first set of air interface resources and the second set of air interface resources being mutually exclusive, and (ii) one or more additional base stations each configured for providing wireless services using the second set of air interface resources on the second wireless carrier band, wherein the operations comprise: making a determination that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2A is a conceptual illustration of a division of a shared downlink channel into downlink resource blocks, in accordance with an example embodiment.

FIG. 2B is a conceptual illustration of a downlink resource block, in accordance with an example embodiment.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
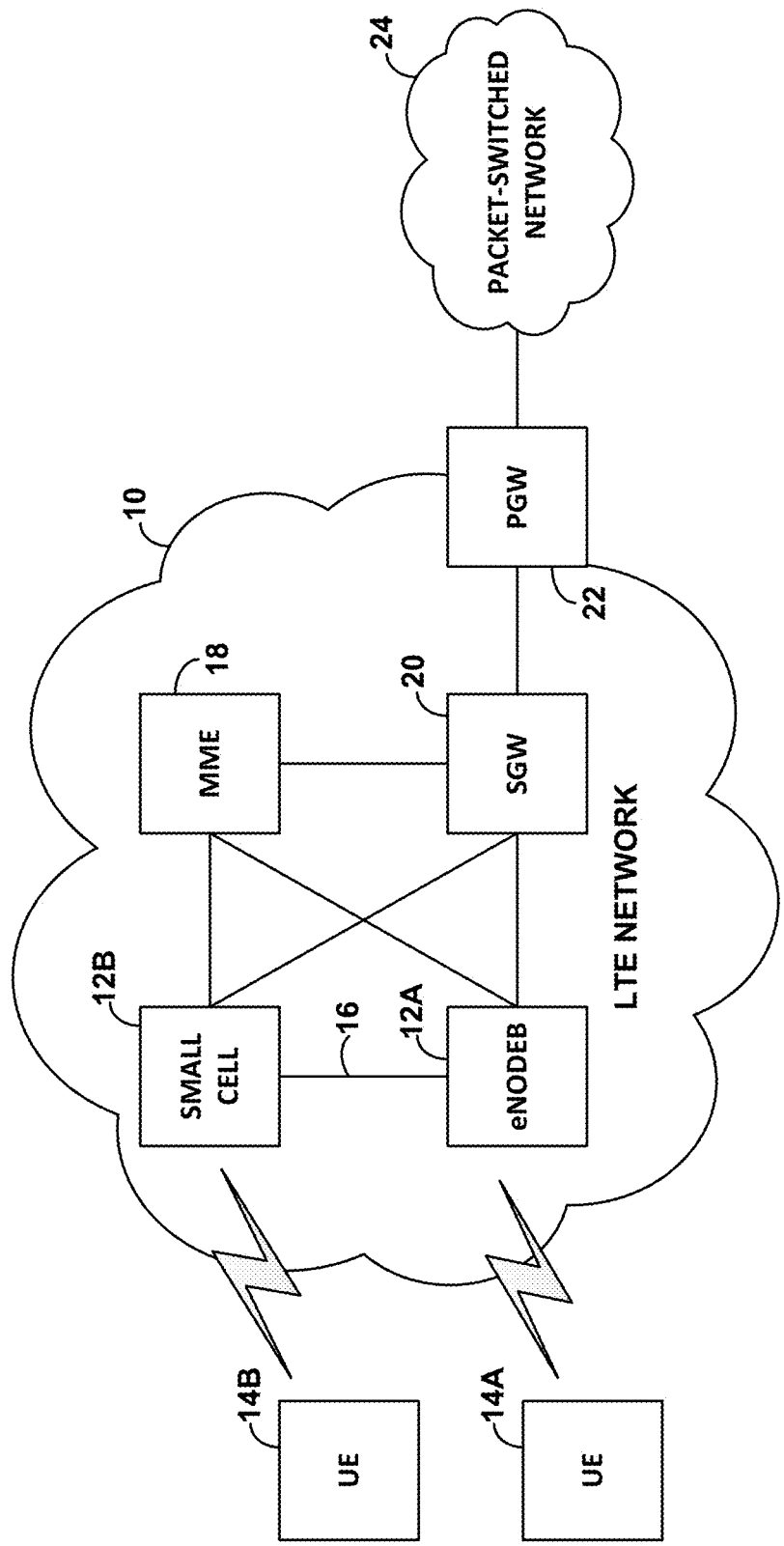
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly VoIP service, but may also provide other functions. As shown, the LTE network 10 includes an example LTE macro base station known as an eNodeB 12A, which has an antenna structure and associated equipment for providing an LTE coverage area in which to serve UEs such as an example UE 14A as shown. Additionally, the LTE network 10 includes a small cell 12B that radiates to define another coverage area to serve UEs such as example UE 14B. As further discussed below, the eNodeB 12A and small cell 12B may communicate with each other over an X2 interface 16.

As shown in FIG. 1, the eNodeB 12A and small cell 12B each have a communication interface with a mobility management entity (MME) 18 that functions as a signaling controller for the LTE network 10. Further, the eNodeB 12A and small cell 12B each have a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12A and small cell 12B may be communicatively linked with one or more core networks, which may be operated by the one or more wireless service providers. The core network(s) then provide connectivity with one or more MMEs, such as MME 18, as well as one or more gateways such as SGW 20 and PGW 22.

Although not expressly shown in FIG. 1, the small cell 12B may not physically connect directly with network infrastructure components, such as the MME 18 or the eNodeB 12A (via the X2 interface 16), but instead may be deployed on a less formally-engineered basis, for example as a plug-and-play consumer device. In such a configuration, the small cell could access a public data network, such as the Internet, by way of an Internet service provider (ISP), and then connect securely to a carrier's wireless network (such as the LTE network 10) via a virtual private network (VPN), for instance. With VPN connectivity established, a small cell can then function and communicate with the wireless network as described above and in more detail below.

In line with the discussion above, the eNodeB 12A and small cell 12B may each provide service on multiple carriers and may be equipped to serve UEs with carrier aggregation using those multiple carriers. Further, UEs 14A and 14B may be equipped to support carrier aggregation. For certain communications (e.g., for communication of bearer data on one or more particular bearers), the eNodeB 12A may serve the UE 14A using carrier aggregation and the small cell 12B may serve the UE 14B also using carrier aggregation, whereas for other communications one or both of UEs 14A and 14B may be served without using carrier aggregation.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, a base station and a served UE may transmit symbols to each other in these resource elements, particularly on subcarriers that are spaced apart from each other by 15 kHz and in time segments spanning 67 μs each.

FIG. 2A illustrates how the downlink resources in a given wireless coverage area may be divided in time and frequency domains into resource blocks under LTE. In the time domain, each resource block occupies a 1 ms subframe. By way of example, FIG. 2A shows resource blocks 100-110 for a particular subframe. In the frequency domain, each of resource blocks 100-110 occupies a respective portion of frequency bandwidth, typically 180 kHz. Although FIG. 2A shows six resource blocks in each subframe, a wireless coverage area could have a greater number of resource blocks, as indicated by the dots above and below resource blocks 100-110. For instance, in a 5 MHz LTE carrier, a total of 25 resource blocks may span each 1 ms subframe.

FIG. 2A also includes a more detailed view of downlink resource block 108. This detailed view shows that the 180 kHz of frequency bandwidth corresponds to 12 subcarriers of 15 kHz each, and also shows that the 1 ms subframe corresponds to the duration of 14 OFDM symbols (although the number of OFDM symbols in a downlink resource block can vary). Each OFDM symbol spans the 12 subcarriers and includes a respective subcarrier symbol on each subcarrier. Thus, as noted above, a downlink resource block may be described as a set of resource elements, with each resource element corresponding to a subcarrier symbol that is carried on a particular subcarrier for the duration of one OFDM symbol. The detailed view of downlink resource block 108 in FIG. 2A shows the division of the resource block into multiple resource elements, such as resource element 108a.

Different resource elements in a downlink resource block may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a downlink resource block could have other configurations as well.

In LTE as currently defined by way of example, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Figure 2C:
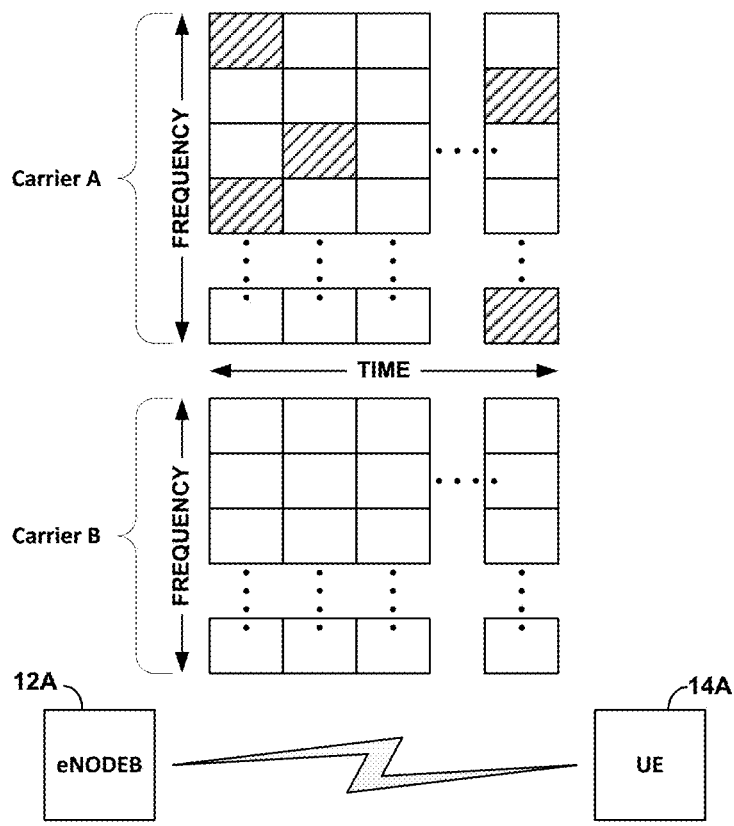
FIG. 2C is a conceptual illustration of air interface resources on different carriers of a macro base station and a small cell.
Figure 2C:
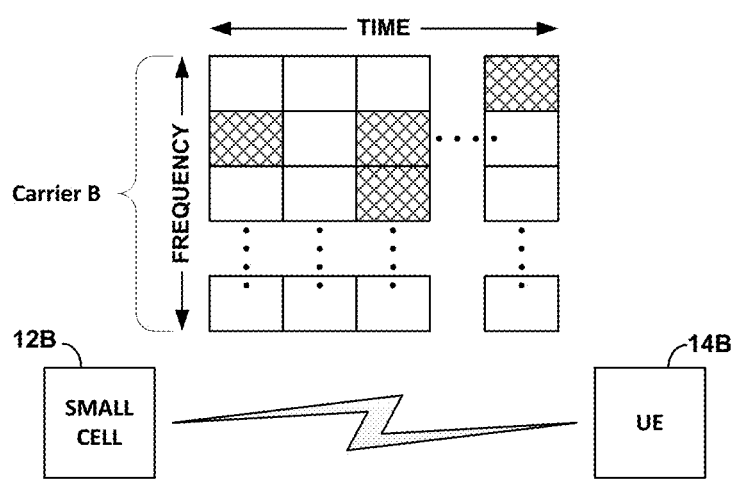
Figure 2D:
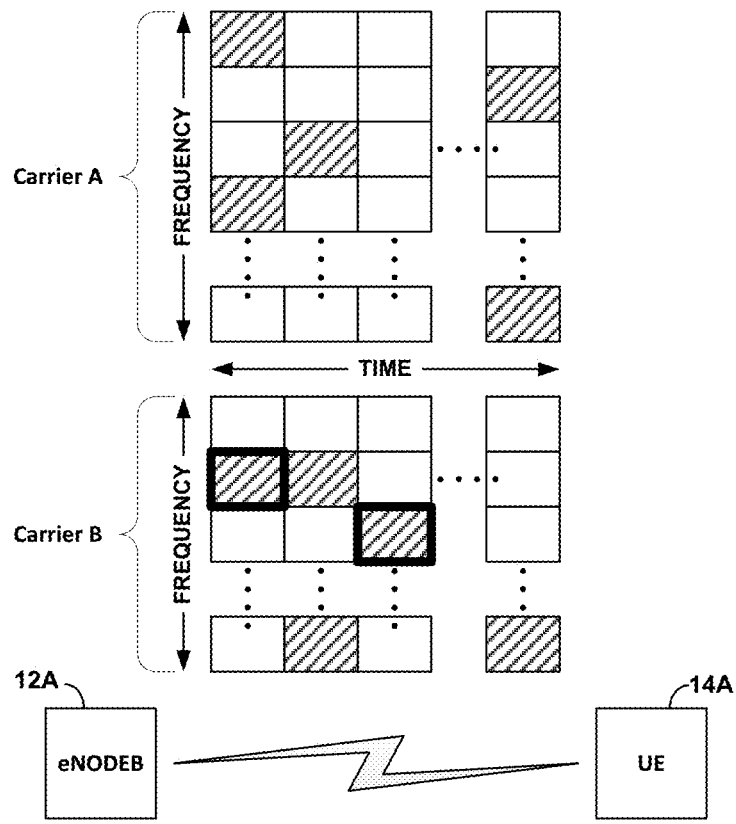
FIG. 2D is a conceptual illustration of air interface resources on different carriers of a macro base station using carrier aggregation and a small cell using one carrier.
Figure 2D:
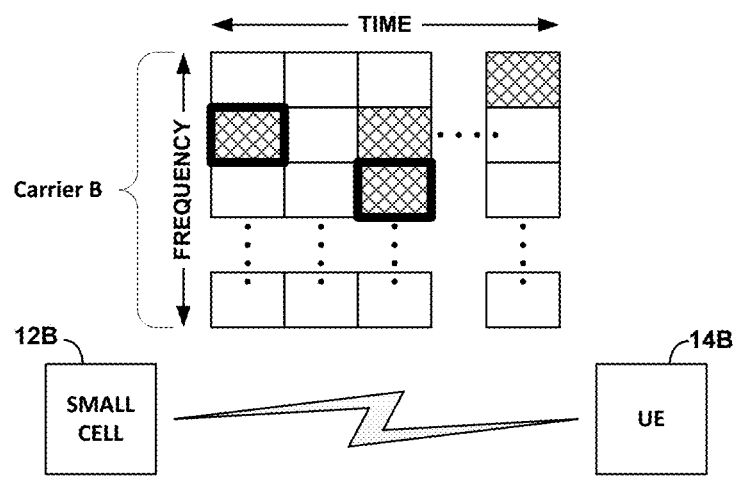

FIGS. 2C and 2D are conceptual illustrations of air interface resources on different carriers of a macro base station and a small cell, under operation with and without carrier aggregation. As shown by way of example in the figures, a macro base station, represented by eNodeB 12A, can communicate with a UE 14A on one or both of Carrier A and Carrier B, and a small cell 12B communicates with a UE 14B on just Carrier B. Each carrier includes a respective set of air interface resources, represented by blocks arranged vertically across frequency and horizontally across time. For example, in operation under LTE, the blocks could correspond to resource blocks, such as the resource blocks 100-110 illustrated in FIG. 2A. Thus, each block in FIGS. 2C and 2D could include 12 subcarriers in frequency (the vertical direction) and 14 OFDM symbols in time (the horizontal direction). The total frequency span of each of Carriers A and B could be one of 1.4 MHz, 3 MHz, 5 MHz, 10 MHz, or 20 MHz, as defined, for example, under LTE.

Vertical and horizontal ellipses in FIGS. 2C and 2D represent intervening blocks (air interface resources) not expressly shown in the figures. Thus, Carrier A is depicted with five expressly-shown resource blocks across frequency, with possibly additional resource blocks represented by vertical ellipses between the fourth and fifth expressly-shown resource blocks. Similarly, Carrier B is depicted with four expressly-shown resource blocks across frequency, with possibly additional resource blocks represented by vertical ellipses between the third and fourth expressly-shown resource blocks. The total number of resource blocks in frequency in Carrier A could be the same or different from that in Carrier B. Further, Carrier A and Carrier B could each occupy contiguous or non-contiguous portions of a single frequency band, or could occupy respective portions of different frequency bands.

The depiction of the resource blocks in Carriers A and B across time represents transmission of resource blocks. Thus, for example, the horizontal dimension of each block can correspond to one slot, as described in FIG. 2A. In this case, the horizontal ellipses can be taken to represent addition slots not expressly illustrated. Note that transmissions across all frequency components are simultaneous under LTE.

In FIGS. 2C and 2D, air interface resources allocated to the UE 14A by eNodeB 12A are represented by diagonal hatch marks in the allocated blocks. Similarly, air interface resources allocated to the UE 14B by small cell 12B are represented by diagonal cross-hatch marks in the allocated blocks. For purposes of illustration, the respective allocations are shown to be at different frequencies and at different times; however, no particular significance is intended by the allocations represented in the figures. In practice, a scheduler or scheduling function in the wireless communication network makes the allocations for downlink communications, while uplink communications may be made on a random access basis by the UEs.

The depiction in FIG. 2C illustrates operation in which carrier aggregation is not used, or at least is not active during the time or over the frequencies represented in the figure. Thus, while the eNodeB 12A can allocate air interface resources on both Carriers A and B, only air interface resources on Carrier A are shown as allocated for the UE 14A in FIG. 2C. At the same time, the small cell 12B allocates air interface resources for the UE 14B only on Carrier B. In an example embodiment, the small cell 12B may be configured to use only one wireless carrier band at any given time; in other embodiments, small cells may be capable of supporting carrier aggregation as well. Since Carriers A and B occupy different portions of a RF spectrum, the transmissions on each band don't interfere with one another. Thus, for example, the air interface resources allocated for the UE 14A and those allocated for the UE 14B don't interfere during transmission.

The depiction in FIG. 2D is largely the same as that in FIG. 2C, but now carrier aggregation is used for communications between the eNodeB 12A and the UE 14A. This is represented by the addition air interface resources allocated to the UE 14A on Carrier B. FIG. 2D also illustrates how, because Carrier B is now being used for communications both between eNodeB 12A and the UE 14A and between eNodeB 12B and the UE 14B, there are air interface resources that can be subject to interference. More specifically, air interface resources of the different air interface links that occupy the same frequencies and time slots can interfere with one another. In FIG. 2D, the blocks representing air interface resources that can interfere with one another are drawn with thick, black rectangular borders. The interfering air interface resources are ones that occur at the same frequency components and at the same times. Such interference could adversely impact one or the other or both communications. The likelihood of such interference can depend, at least in part, on the degree of overlapping coverage between the eNodeB 12A and the small cell 12B, together with degree of loading on Carrier B (or any other common carrier) experienced by these two base stations.

Other factors can include how many small cells are operating with at least some overlapping coverage on the secondary carrier.

In the illustrations in FIGS. 2C and 2D, an "air interface resource" is taken to be a resource block, for example as specified under LTE. In this case, Carriers A and B include respective, different sets of air interface resources. For example, if both carriers correspond to a 1.4 MHz band under LTE, then both would include separates sets of 6 resource blocks in frequency. In another example Carriers A could correspond to a 5 MHz LTE carrier including 25 resource blocks in frequency, and Carrier B could correspond to a 1.4 MHz LTE carrier including 6 resource blocks in frequency. Other arrangements are possible as well.

It will be appreciated that air interface resources can correspond to other time and/or frequency units. For example, air interface resources could correspond to LTE resource elements, or to LTE subcarriers in given carrier band. Identification of air interface resources as resource blocks can be convenient because a resource block is typically the smallest unit of resource allocated at any one time to a UE. Thus, carrier aggregation can be described as allocation of at least one air interface resource from a first set of air interface resources on a first carrier, and at least one air interface resource from a different, second set of air interface resources on a different, second carrier. However, this description can be adapted to other definitions of air interface resources, such as LTE resource elements, LTE channels constructed from particular portions of resource blocks, and so on.

Figure 3:
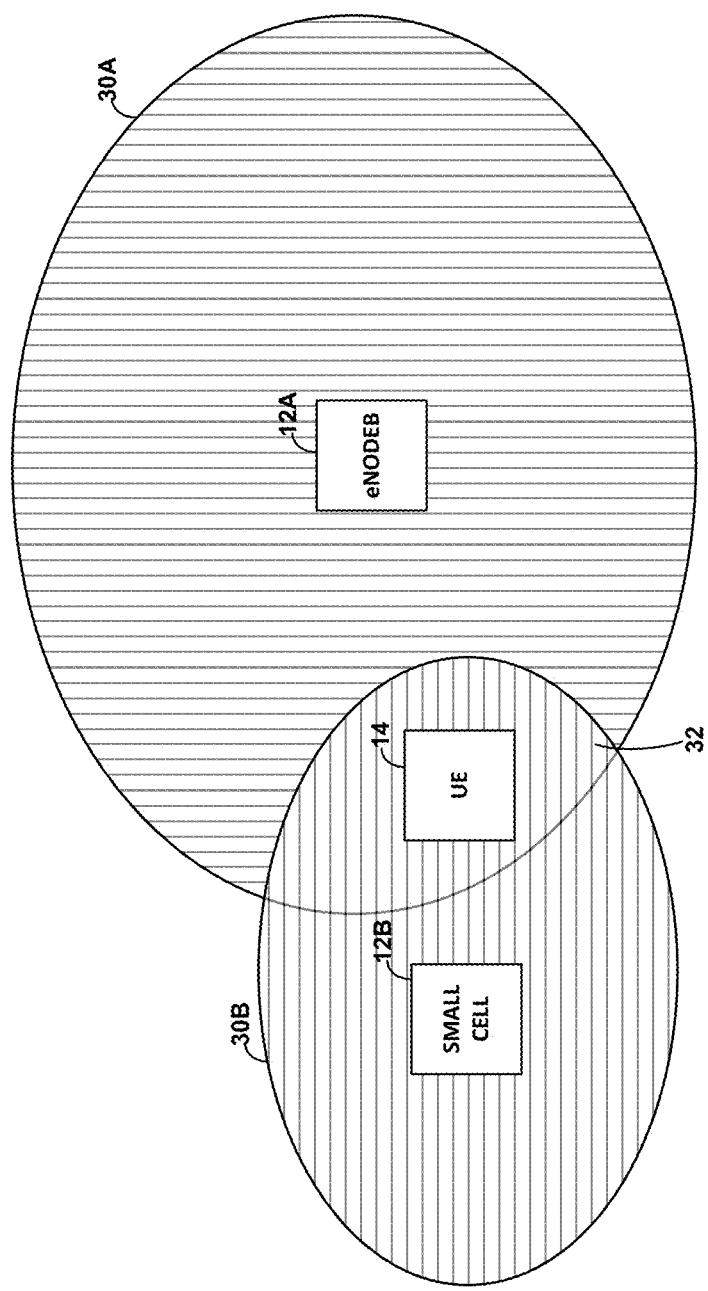
FIG. 3 is a conceptual illustration of first and second base stations defining partially overlapping coverage areas, in accordance with an example embodiment.

As mentioned above, a wireless communication system may include base stations defining coverage areas that at least partially overlap. To illustrate, consider FIG. 3 depicting an arrangement showing the eNodeB 12A defining a coverage area 30A and the small cell 12B defining a coverage area 30B. In the arrangement shown in FIG. 3, coverage area 30A is larger than coverage area 30B because a small cell 12B typically operates at a lower transmission power for providing a smaller range of coverage. However, coverage areas 30A and 30B may take on any size and shape.

Additionally, as shown in FIG. 3, coverage areas 30A and 30B partially overlap in overlapping region 32. Various UEs, such as example UEs 14A and/or 14B, positioned in the overlapping region 32 may receive service from either the eNodeB 12A or the small cell 12B. In this arrangement, as discussed above, the eNodeB 12A and the small cell 12B may serve UEs on the same set of multiple carriers. In practice, coverage areas may differ for different carriers. However, for purposes of illustration only, it may be assumed that coverage areas for the set of multiple carriers are at least partially the same such that eNodeB 12A and the small cell 12B can serve UEs 14A and 14B on at least some of the same set of multiple carriers. Further, note that the arrangements described herein are not limited to an eNodeB and a small cell and may extend to various types of base stations.

As noted above, carrier aggregation can be beneficial both for increased data transmission rates made possible by the increased bandwidth, and for helping distribute at least part of the load on a primary carrier to one or more secondary carriers that are made available through aggregation. In order to effectively derive the benefit of increased data transmission rates, a UE that may be a candidate for carrier aggregation should be operating under favorable RF conditions. Thus, the presence in a base station's coverage area of one or more UEs operating under conditions favorable to carrier aggregation can be one of the criteria for deciding to activate carrier aggregation. If the primary carrier of a macro base station is not heavily loaded, then increased bandwidth for one or more UEs may be available on the primary carrier, possibly diminishing the need for, and/or advantage of, carrier aggregation. However, if the primary carrier is heavily loaded, then it may not be prudent or possible to offer significantly increased bandwidth on the primary carrier. Hence, relatively heaving loading on the macro base station's primary carrier can be another one of the criteria for deciding to activate carrier aggregation. Taken together, these two criteria can serve as a trigger to activate carrier aggregation.

At the same time, carrier aggregation can also result in interference within a region of overlapping coverage by two or more base stations operating on the same carrier(s). While such interference can be avoided or mitigated to some extent through base station deployment planning and with active techniques such as inter-cell interference coordination, circumstances can still occur in which interference on one or more common carrier frequencies arises. For example, some types of small cells, such as femtocells, can be deployed on a plug-and-play basis as consumer devices. This can result in ad hoc and/or unpredictable degrees of overlapping coverage with that provided by a macro base station. Moreover, such overlapping coverage can vary with time in a largely unpredictable manner. If these overlapping small cells operate on one or more of the macro base station's secondary carriers (i.e., those used for carrier aggregation), then there can be times when the benefits of carrier aggregation may be offset by unacceptably high interference on the secondary carrier(s).

In accordance with example embodiments, operation of one or more small cells that provide at least partially-overlapping coverage with a macro base station can be taken into account when determining whether or not to activate carrier aggregation within the macro base station's coverage area. More particularly, the load on the one or more small cells can be analyzed, and the result can be applied as a sort of filter to any trigger-based activation of carrier aggregation by the macro base station. For example, if the load of the one or more small cells on one or more secondary carriers of the macro base station exceeds a threshold load level, then a trigger condition that would otherwise cause the macro base station to activate carrier aggregation using the one or more secondary carriers can be disregarded by the macro base station. As a result, the macro base station will refrain from using carrier aggregation, and unacceptably high and/or widespread interference on one or more secondary carriers that might otherwise occur can be avoided.

The load on a small cell can be monitored by an entity in a wireless network, such as the LTE network 10 shown in FIG. 1. Although not expressly shown in FIG. 1, one example of such a network entity is a small cell element management system (EMS) configured for tracking and monitoring small cells in a wireless network. In accordance with example embodiments, a small cell can establish communications with an EMS when the small cell registers in the network, possibly as part of a registration process. In this way, the EMS can acquire initial operating data, such as the small cell's location, and the like. In course of the small cell's operation, it could continually or periodically update the EMS with operating statistics, such as load, RF conditions, and carriers used. The EMS can use this information to maintain an active database for monitoring the small cell. Further, the EMS can carry out the same functions for other small cells in the wireless network. In addition, there could be more than one EMS in a wireless network, such as the LTE network 10. For example, multiple small cell EMS devices could be deployed on a regional basis, or possibly as part of some or all macro base stations.

In further accordance with example embodiments, the small cell EMS can be communicatively connected with one or more macro base stations, and provide them information about one or more small cells operating in or near the coverage area provided by the one or more macro base stations. In particular, the information could include statistics relating to the load on the one or more small cells, as well as possibly the number of small cells. A macro base station can then use the received information to adapt its behavior when determining whether or not to use carrier aggregation, as described above.

Operating conditions of small cells that can impact whether and how much interference might result from carrier aggregation generally include the load on each of one or more small cells, the total load on all small cells in or near a macro base station, and the total number of small cells in or near a macro base station. Various metrics can be used to measure the load on an individual small cell at any given time. Non-limiting examples include the number of users or UEs currently being served, the number of active calls and/or data sessions underway, a capacity utilization of total bandwidth available (e.g., a percentage of the total), a total volume of data transmitted on uplinks and/or downlinks, and a capacity utilization of the total number of sessions that can be supported at any one time. The total load on all of a particular group of small cells can then be a total of the individual loads. The particular group of small cells can be those identified as operating in or near the coverage area of a given macro base station—e.g., those providing coverage that at least partially overlaps with that provided by the macro base station.

A macro base station, or an EMS that provides the macro base station with small cell operational information, can compare the total load to a threshold level to determine whether or not carrier aggregation would be likely to result in too high and/or too much interference on one or more of the macro base station's secondary carriers. The total load on the small cells could be applied directly, or it could be computed as a fraction of a grand total load, including the load on the macro base station. If the threshold is exceeded—where the threshold level is defined appropriately for either a direct total load or a fractional grand total load—the macro base station can then respond by disregarding a trigger (or other criteria-based mechanism) that would otherwise cause it to activate carrier aggregation. As noted, the total number of small cells providing overlapping coverage can be applied as additional or alternative criteria for causing a macro base station to refrain from using carrier aggregation at any particular time. At some later time, if the load criteria no longer exceed the threshold, the macro base station can again use carrier aggregation under conditions that permit or trigger it.

Figure 4A:
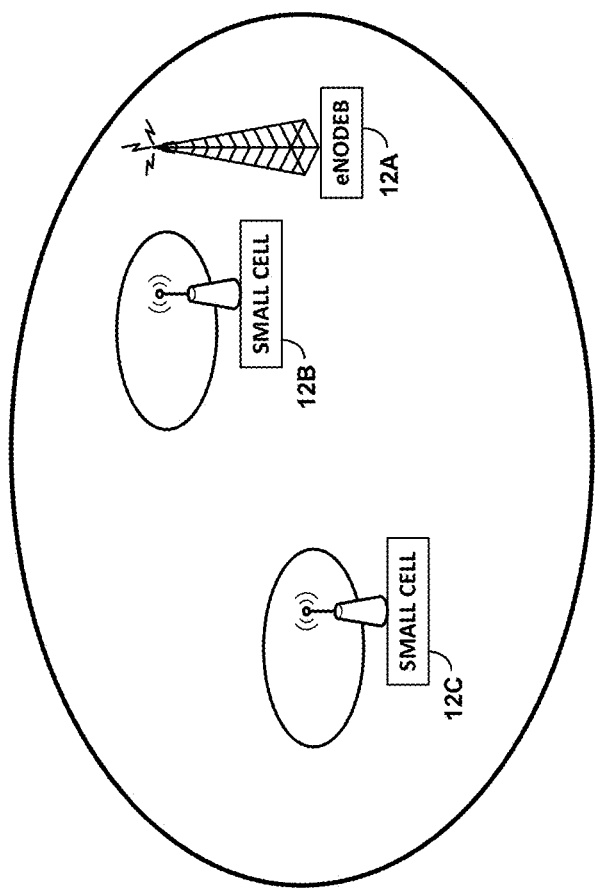
FIG. 4A is a conceptual illustration of overlapping coverage of a macro base station and small cells under a first scenario of operating conditions.
Figure 4B:
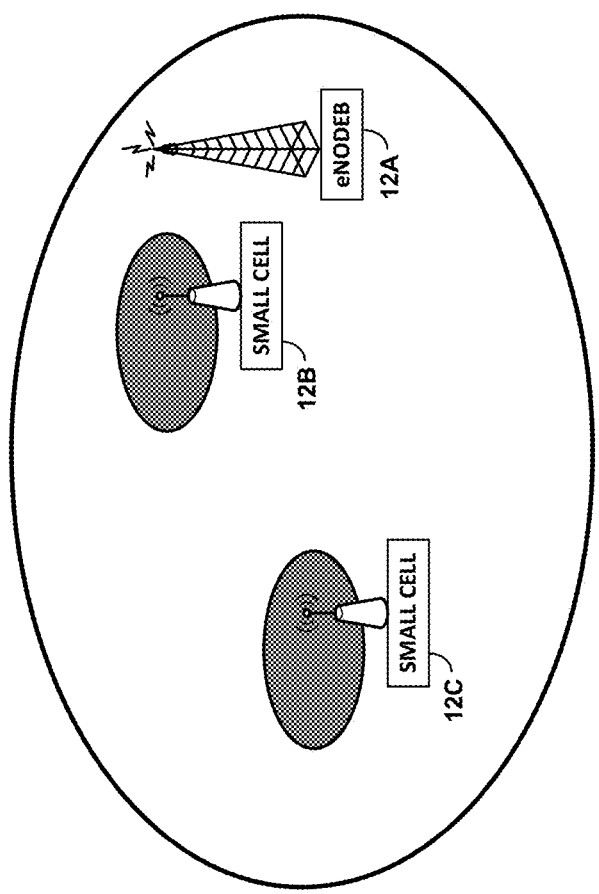
FIG. 4B is a conceptual illustration of overlapping coverage of a macro base station and small cells under a second scenario of operating conditions.
Figure 4C:
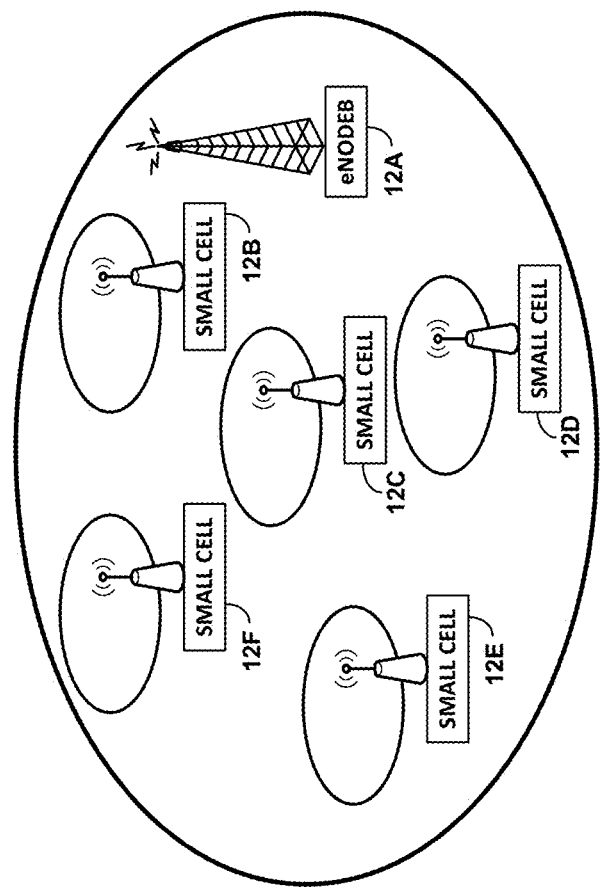
FIG. 4C is a conceptual illustration of overlapping coverage of a macro base station and small cells under a third scenario of operating conditions.

FIGS. 4A, 4B, and 4C are conceptual illustrations of overlapping coverage scenarios that can be considered in a determination of whether or not to use carrier aggregation, in accordance with example embodiments. The three scenarios depicted represent: (1) loading and total number of small cells below respective threshold, so that carrier aggregation can be activated if the trigger criteria are met; (2) total loading above a threshold level while total number is below a threshold number, so that carrier aggregation is prevented (e.g., a trigger is filtered out or disregarded); and (3) total number of small cells above a threshold number while total loading below a threshold level, so that, again, carrier aggregation is prevented. A combination of (2) and (3)—i.e., total loading above a threshold level and total number above a threshold number—is not shown, assuming that either (2) or (3) would be sufficient to warrant against carrier aggregation.

FIG. 4A shows an eNodeB 12A (e.g, a macro base station) and two small cells 12B and 12C. A large oval surrounding the eNodeB 12A represents the coverage area of the macro base station. A small oval associated with each of the small cells 12B and 12C represents the coverage area of each small cell. By way of example, each of the small cell's coverage area completely overlaps with that of the eNodeB 12A. It will be appreciated that the overlap of either or both small cells could be partial. In the example scenario of FIG. 4A, the coverage areas of the small cells 12B and 12C are both shown in white, representing a low individual and total load (scenario (1)). Under this scenario, the eNodeB 12A would use carrier aggregation with one or more UEs if operating conditions fulfilled the trigger criteria.

FIG. 4B illustrates a scenario in which a load threshold is exceeded (scenario (2)). In this case, the coverage areas of the small cells 12B and 12C are both shown shaded gray, representing a high individual and total load. As a result, the eNodeB 12A will not use carrier aggregation even if operating conditions with one or more UEs fulfills the trigger criteria. As noted, the total load of the two small cells could be compared to a total load threshold, or could be computed as a fraction of a grand total load that includes the load on the eNodeB 12A. For example, using total load in the threshold test, the total load could simply be a tally or average of the loads of each of the small cells 12B and 12C. Using fractional load, the total load of the small cells 12B and 12C could be divided by a grand total load of the small cells 12A, 12B and 12C. As an example, a total fractional threshold could be set at 40%, so that if the total fractional load of the small cells is at least 0.4 of the grand total (macro base station plus small cells), the threshold would be considered to have been exceeded.

FIG. 4C a scenario in which a number threshold is exceeded (scenario (3)). This case is illustrated by including three additional small cells 12D, 12E, and 12F within the coverage area of the eNodeB 12A. The coverage areas of the small cells 12B, 12C, 12D, 12E, and 12F are both all shown in white, representing a low individual and total load. However, taking, by way of example, the number threshold test to be N≥5, where N is the number of small cells, this example scenario would again result in the eNodeB 12A refraining from using carrier aggregation even if operating conditions with one or more UEs fulfills the trigger criteria.

As noted, a combination of the excessive load and large total number of small cells is not specifically considered, under an assumption that exceeding either type of threshold can be considered sufficient to cause a macro base station to refrain from using carrier aggregation. However, a load criterion and a number criterion can still be jointly applied when neither threshold by itself is exceeded. In this case, some form or of average of load and number can be computed and used in a comparison test. Such averages could take various forms. For instance, an average of a load-to-threshold-load ratio plus number-to-threshold-number ratio could be compared to yet another threshold value. As an example, an observed total load might be 70% of the threshold load while an observed total number might be 80% of the number threshold, yielding a simple average of 75% (e.g., (70+80)/2). Assuming a combined threshold value of 70%, the average would exceed the combined threshold, a condition that could thus cause the macro base station to refrain from using carrier aggregation, even though neither of the load or number thresholds is individually exceeded. It will be appreciated that other types of joint threshold tests could be used in the determination of whether or not to activate carrier aggregation.

Figure 5:
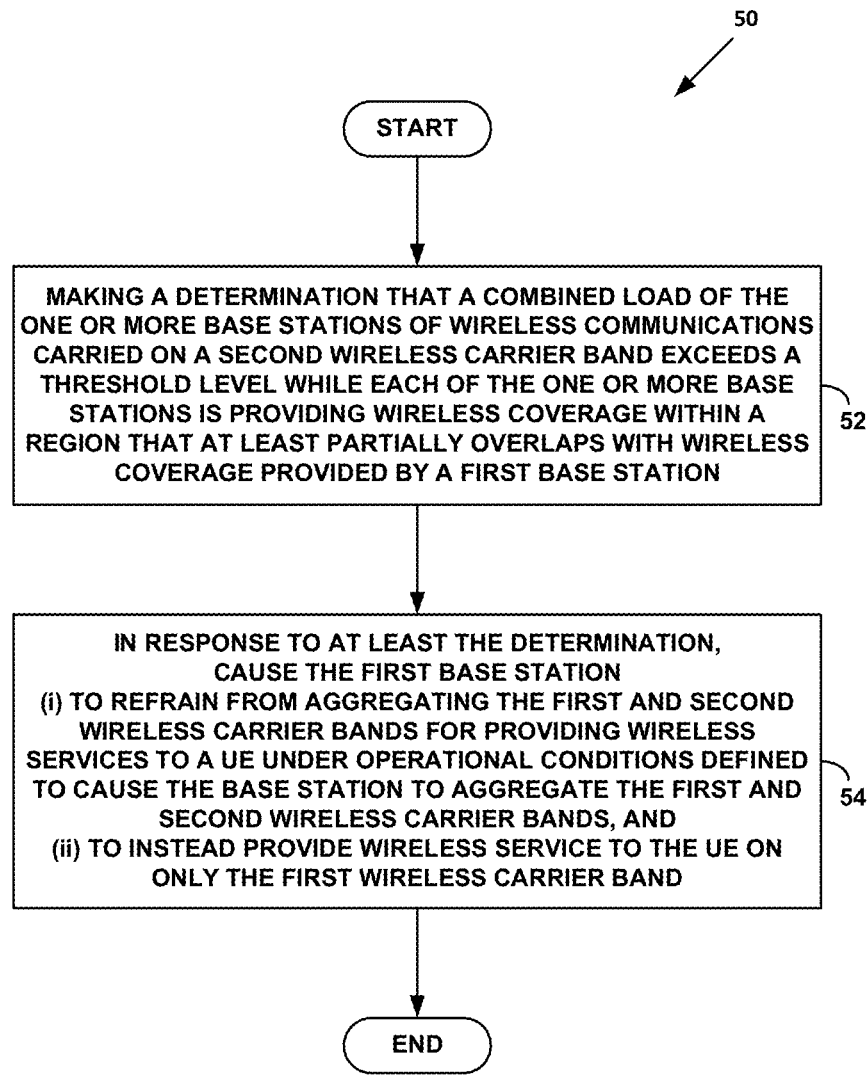
FIG. 5 is a flowchart illustrating a method for dynamic management of carrier aggregation based on small cell operating conditions, in accordance with an example embodiment.

FIG. 5 is a flowchart illustrating a method 50, according to an example embodiment. Illustrative methods, such as method 50, may be carried out in whole or in part by a component(s) and/or arrangement(s) in a wireless communication system, such as by the one or more of the components of the representative LTE network 10 shown in FIG. 1, with one or more of the air interface arrangements shown in FIGS. 2A-2D, and/or with the arrangement shown in FIG. 3. However, it should be understood that example methods, such as method 50, may be carried out by other entities or combinations of entities as well as in other arrangements, without departing from the scope of the invention. By way of example, the method 50 can be implemented as machine language instructions that can be stored on non-transient machine-readable media (e.g, solid state memory, magnetic disk, etc), and that when executed by one or more processors of a wireless communication system or component(s) thereof cause the wireless communication system to carry out operations, steps, and/or functions of the method.

Method 50 may be operable in a wireless communication system that includes a first base station configured for providing wireless services using a first set of air interface resources on a first wireless carrier band and using a second set of air interface resources on a second wireless carrier band. In this arrangement, the first set of air interface resources and the second set of air interface resources can be taken to be mutually exclusive. The wireless communication system can further include one or more additional base stations each configured for providing wireless services using the second set of air interface resources on the second wireless carrier band.

As shown by block 52 in FIG. 5, method 50 involves the wireless communication system making a determination that a combined load of the one or more additional base stations of wireless communications carried on the second wireless carrier band exceeds a threshold level, and, in particular, the threshold level is exceeded while each of the one or more additional base stations is providing wireless coverage within a region that at least partially overlaps with wireless coverage provided by the first base station.

As shown by block 54 in FIG. 5, method 50 next involves, in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

In accordance with example embodiments, the first base station can correspond to a macro base station, and each of the one or more additional base stations can correspond to a respective small cell. Further, the first base station can define a first wireless coverage area, and each of the one or more additional base stations can define a respective wireless coverage area that at least partially overlaps with the first wireless coverage area.

In further accordance with example embodiments, the wireless communication system can include a network entity configured for managing small cells, such as the small cell EMS described above. In such an arrangement, the network entity could make the determination of the threshold level being exceeded. More specifically, making the determination can entail the network entity monitoring respective operating conditions of each of the one or more additional base stations. The respective operating conditions could, in turn, include a respective load of each of the one or more additional base stations of wireless services provided on the second wireless carrier band to one or more UEs in a respective wireless coverage area, and the network entity could compute a total of all the respective loads of all of the one or more additional base stations.

In further accordance with example embodiments, causing the first base station to refrain from aggregating the first and second wireless carrier bands for providing wireless services to a UE under operational conditions defined to cause the base station to aggregate the first and second wireless carrier bands can entail the network entity providing the first base station with information indicative of the determination.

More generally, making the determination that the threshold level has been exceeded can entail monitoring a respective load of each of the one or more additional base stations of wireless services provided on the second wireless carrier band to one or more UEs in a respective wireless coverage area. By way of example the respective load could correspond to any one or more of: a number of UEs served on the second wireless carrier band, an amount of data transmitted on the second wireless carrier band, a capacity utilization of the second wireless carrier band, or a number of users served on the second wireless carrier band. In further accordance with example embodiments, making the determination could additionally or alternatively entail determining that the total number of all the one or more additional base stations exceeds a threshold number.

Also in further accordance with example embodiments, the example method 50 could also entail subsequently re-enabling carrier aggregation. For example, in response to both (i) subsequently determining that the combined load no longer exceeds the threshold level and (ii) determining that operational conditions permit aggregating the first and second wireless carrier bands for providing wireless services by the first base station to at least one UE, the first base station can aggregate the first and second wireless carrier bands for providing wireless services to the at least one UE.

In accordance with example embodiments, aggregating the first and second wireless carrier bands for providing wireless services to the UE can entail simultaneously using at least a portion of the first set of air interface resources on the first wireless carrier band and at least a portion of the second set of air interfaces on the second wireless carrier band to carry wireless communications between first base station and the UE.

Also in accordance with example embodiments, the operational conditions defined to cause the base station to aggregate the first and second wireless carrier bands can correspond to a trigger indicating that radio frequency (RF) operating conditions of the UE exceeds a threshold RF quality level and that a load carried on the first wireless carrier band of wireless communications exceeds a first threshold load level. Under such triggered operation or activation of carrier aggregation, causing the first base station to refrain from aggregating the first and second wireless carrier bands for providing wireless services to a UE under the operational conditions defined to cause the base station to aggregate the first and second wireless carrier bands can entail causing the first base station to disregard the trigger.

It will be appreciated that the example method 50 could each include alternate and/or additional steps, while still remaining within the scope and spirit of example embodiments herein.

Exemplary embodiments have been described above. Those skilled in the art will understand, however, that changes and modifications may be made to these embodiments without departing from the true scope and spirit of the invention.

We claim:

1. A method operable in a wireless communication system including (i) a first base station configured for providing wireless services using a first set of air interface resources on a first wireless carrier band and using a second set of air interface resources on a second wireless carrier band, the first set of air interface resources and the second set of air interface resources being mutually exclusive, and (ii) one or more additional base stations each configured for providing wireless services using the second set of air interface resources on the second wireless carrier band, the method comprising:

making a determination, by the wireless communication system, that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

2. The method of claim 1, wherein the first base station comprises a macro base station, and wherein each of the one or more additional base stations comprises a respective small cell.

3. The method of claim 2, wherein the wireless communication system further includes a network entity configured for managing small cells, and wherein making the determination comprises:

monitoring, by the network entity, respective operating conditions of each of the one or more additional base stations, wherein the respective operating conditions include a respective load of each of the one or more additional base stations of wireless services provided on the second wireless carrier band to one or more UEs in a respective wireless coverage area; and computing, by the network entity, a total of all the respective loads of all of the one or more additional base stations.

4. The method of claim 3, wherein causing the first base station (i) to refrain from aggregating the first and second wireless carrier bands for providing wireless services to a UE under operational conditions defined to cause the base station to aggregate the first and second wireless carrier bands comprises the network entity providing the first base station with information indicative of the determination.

5. The method of claim 1, wherein the first base station defines a first wireless coverage area, and wherein each of the one or more additional base stations defines a respective wireless coverage area that at least partially overlaps with the first wireless coverage area.

6. The method of claim 1, further comprising:
in response to both (i) subsequently determining that the combined load no longer exceeds the threshold level and (ii) determining that operational conditions permit aggregating the first and second wireless carrier bands for providing wireless services by the first base station to at least one UE, aggregating the first and second wireless carrier bands for providing wireless services to the at least one UE.

7. The method of claim 1, wherein making the determination comprises monitoring a respective load of each of the one or more additional base stations of wireless services provided on the second wireless carrier band to one or more UEs in a respective wireless coverage area,
wherein the respective load is at least one of: a number of UEs served on the second wireless carrier band, an amount of data transmitted on the second wireless carrier band, a capacity utilization of the second wireless carrier band, or a number of users served on the second wireless carrier band.

8. The method of claim 7, wherein making the determination further comprises determining that a total number of all the one or more additional base stations exceeds a threshold number.

9. The method of claim 1, wherein aggregating the first and second wireless carrier bands for providing wireless services to the UE comprises simultaneously using at least a portion of the first set of air interface resources on the first wireless carrier band and at least a portion of the second set of air interfaces on the second wireless carrier band to carry wireless communications between first base station and the UE.

10. The method of claim 1, wherein the operational conditions defined to cause the base station to aggregate the first and second wireless carrier bands comprise a trigger indicating that radio frequency (RF) operating conditions of the UE exceed a threshold RF quality level and that a load carried on the first wireless carrier band of wireless communications exceeds a first threshold load level,
and wherein causing the first base station to refrain from aggregating the first and second wireless carrier bands for providing wireless services to a UE under the operational conditions defined to cause the base station to aggregate the first and second wireless carrier bands comprises causing the first base station to disregard the trigger.

11. A wireless communication system comprising:
a first base configured for providing wireless services using a first set of air interface resources on a first wireless carrier band and using a second set of air interface resources on a second wireless carrier band, the first set of air interface resources and the second set of air interface resources being mutually exclusive;
one or more additional base stations each configured for providing wireless services using the second set of air interface resources on the second wireless carrier band; and
a network entity configured for communication with the first base station and with each of the one or more additional base stations, wherein the network entity is further configured for:
making a determination that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and
in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

12. The wireless communication system of claim 11, wherein the first base station comprises a macro base station, and wherein each of the one or more additional base stations comprises a respective small cell,
and wherein the first base station defines a first wireless coverage area, and wherein each of the one or more additional base stations defines a respective wireless coverage area that at least partially overlaps with the first wireless coverage area.

13. The wireless communication system of claim 11, wherein making the determination comprises:
monitoring a respective load of each of the one or more additional base stations of wireless services provided on the second wireless carrier band to one or more UEs in a respective wireless coverage area; and
comparing a total number of all the one or more additional base stations with a threshold number,
wherein the respective load is at least one of: a number of UEs served on the second wireless carrier band, an amount of data transmitted on the second wireless carrier band, a capacity utilization of the second wireless carrier band, or a number of users served on the second wireless carrier band.

14. The wireless communication system of claim 11, wherein aggregating the first and second wireless carrier bands for providing wireless services to the UE comprises simultaneously using at least a portion of the first set of air interface resources on the first wireless carrier band and at least a portion of the second set of air interfaces on the second wireless carrier band to carry wireless communications between first base station and the UE.

15. The wireless communication system of claim 11, wherein the operational conditions defined to cause the base station to aggregate the first and second wireless carrier bands comprise a trigger indicating that radio frequency (RF) operating conditions of the UE exceed a threshold RF quality level and that a load carried on the first wireless carrier band of wireless communications exceeds a first threshold load level,
and wherein causing the first base station to refrain from aggregating the first and second wireless carrier bands for providing wireless services to a UE under the operational conditions defined to cause the base station to aggregate the first and second wireless carrier bands comprises causing the first base station to disregard the trigger.

16. A non-transitory computer readable medium having stored thereon instructions that, upon executing by one or more processors of a wireless communication system, cause the wireless communication system to carry out operations, wherein the wireless communication system includes (i) a first base station configured for providing wireless services using a first set of air interface resources on a first wireless carrier band and using a second set of air interface resources on a second wireless carrier band, the first set of air interface resources and the second set of air interface resources being mutually exclusive, and (ii) one or more additional base stations each configured for providing wireless services using the second set of air interface resources on the second wireless carrier band, wherein the operations comprise:

making a determination that a combined load of the one or more additional base stations of wireless communications carried on the second wireless carrier band exceeds a threshold level while each of the one or more additional base stations is providing wireless coverage within a region that at least partially overlaps with wireless coverage provided by the first base station; and in response to at least the determination, causing the first base station (i) to refrain from aggregating the first and second wireless carrier bands for providing wireless services to a UE under operational conditions defined to cause the base station to aggregate the first and second wireless carrier bands, and (ii) to instead provide wireless service to the UE on only the first wireless carrier band.

17. The non-transitory computer readable medium of claim 16, wherein the first base station comprises a macro base station, and wherein each of the one or more additional base stations comprises a respective small cell, wherein the first base station defines a first wireless coverage area, and wherein each of the one or more additional base stations defines a respective wireless coverage area that at least partially overlaps with the first wireless coverage area, and wherein making the determination comprises:

monitoring a respective load of each of the one or more additional base stations of wireless services provided on the second wireless carrier band to one or more UEs in a respective wireless coverage area; and comparing a total number of all the one or more additional base stations with a threshold number, wherein the respective load is at least one of: a number of UEs served on the second wireless carrier band, an amount of data transmitted on the second wireless carrier band, a capacity utilization of the second wireless carrier band, or a number of users served on the second wireless carrier band.

18. The non-transitory computer readable medium of claim 16, wherein the operations further comprise:

in response to both (i) subsequently determining that the combined load no longer exceeds the threshold level and (ii) determining that operational conditions permit aggregating the first and second wireless carrier bands for providing wireless services by the first base station to at least one UE, aggregating the first and second wireless carrier bands for providing wireless services to the at least one UE.

19. The non-transitory computer readable medium of claim 16, wherein aggregating the first and second wireless carrier bands for providing wireless services to the UE comprises simultaneously using at least a portion of the first set of air interface resources on the first wireless carrier band and at least a portion of the second set of air interfaces on the second wireless carrier band to carry wireless communications between first base station and the UE.

20. The non-transitory computer readable medium of claim 16, wherein the operational conditions defined to cause the base station to aggregate the first and second wireless carrier bands comprise a trigger indicating that radio frequency (RF) operating conditions of the UE exceed a threshold RF quality level and that a load carried on the first wireless carrier band of wireless communications exceeds a first threshold load level, and wherein causing the first base station to refrain from aggregating the first and second wireless carrier bands for providing wireless services to a UE under the operational conditions defined to cause the base station to aggregate the first and second wireless carrier bands comprises causing the first base station to disregard the trigger.

\* \* \* \* \*